United States Patent [19]
Kukes et al.

[11] Patent Number: 5,308,814
[45] Date of Patent: May 3, 1994

[54] DISTILLATE HYDROGENATION CATALYST

[75] Inventors: Simon G. Kukes, Naperville; Frederick T. Clark, Wheaton; P. Donald Hopkins, St. Charles, all of Ill.

[73] Assignee: Amoco Corporation, Chicago, Ill.

[21] Appl. No.: 880,492

[22] Filed: May 8, 1992

Related U.S. Application Data

[62] Division of Ser. No. 769,533, Oct. 1, 1991, Pat. No. 5,147,526.

[51] Int. Cl.$^5$ .............................................. B01J 29/10
[52] U.S. Cl. ...................................... 502/66; 502/74; 502/79
[58] Field of Search .............................. 502/66, 74, 79

[56] References Cited

U.S. PATENT DOCUMENTS

| | | | |
|---|---|---|---|
| 3,197,398 | 7/1965 | Young | 502/66 |
| 3,376,215 | 4/1968 | Bertolacini et al. | 502/66 |
| 3,547,807 | 12/1970 | Hansford | 502/66 |
| 3,781,199 | 12/1973 | Ward | 502/66 |

FOREIGN PATENT DOCUMENTS 130531  4/1978  Fed. Rep. of Germany ........ 502/66

*Primary Examiner*—Carl F. Dees
*Attorney, Agent, or Firm*—Thomas A. Yassen; Richard A. Kretchmer

[57] ABSTRACT

A process and catalyst are provided for hydrogenation of a hydrocarbon feedstock consisting essentially of material boiling between about 150° F. and about 700° F. which comprises reacting the feedstock with hydrogen at hydrogenation conditions in the presence of a catalyst comprising hydrogenation metals and a support comprising zeolite Y. The hydrogenation metals comprise from about 0.1 percent to about 2.0 percent by weight each of palladium and platinum calculated as a percentage of the catalyst. The zeolite Y further comprises sodium in an amount ranging from about 1.5 to about 8.0 percent of the zeolite Y by weight. The process of the present invention provides substantially improved dearomatization performance, increased desulfurization and denitrogenation, increased distillate product cetane number, and increased distillate volume expansion.

12 Claims, No Drawings

5,308,814

DISTILLATE HYDROGENATION CATALYST

This application is a division of U.S. patent application Ser. No. 07/769,533, filed Oct. 1, 1991 now U.S. Pat. No. 5,147,526, for Distillate Hydrogenation.

BACKGROUND OF THE INVENTION

This invention relates to a process and catalyst for reducing the aromatics and olefins content of hydrocarbon distillate products. More particularly, this process relates to an improved catalytic hydrogenation process and catalyst wherein the catalyst comprises platinum and palladium incorporated onto a support comprising zeolite Y and sodium.

For the purpose of the present invention, the term "hydrogenation" is intended to be synonymous with the terms "hydrotreating" and "hydroprocessing," and involves the conversion of hydrocarbons at operating conditions selected to effect a chemical consumption of hydrogen. Included within the processes intended to be encompassed by the term hydrogenation are aromatic hydrogenation, dearomatization, ring-opening, hydrorefining (for nitrogen removal and olefin saturation), and desulfurization (often included in hydrorefining). These processes are all hydrogen-consuming and generally exothermic in nature. For the purpose of the present invention, distillate hydrogenation does not include distillate hydrocracking which is defined as a process wherein at least 15% by weight of the distillate feedstock boiling above 430° F. is converted to products boiling below 430° F.

Petroleum refiners are now facing the scenario of providing distillate fuels, boiling in the range of from about 150° F. to about 700° F., with substantially reduced sulfur and aromatics contents. Sulfur removal is relatively well defined, and at constant pressure and adequate hydrogen supply, is generally a function of catalyst and temperature.

Aromatics removal presents a substantially more difficult challenge. Aromatics removal is generally a function of pressure, temperature, catalyst, and the interaction of these variables on the chemistry and thermodynamic equilibria of the dearomatization reaction. The dearomatization process is further complicated by the wide variances in the aromatics content of the various distillate component streams comprising the hydrogenation process feedstock, the dynamic nature of the flowrates of the various distillate component streams, and the particular mix of mono-aromatics and polycyclic aromatics comprising the distillate component streams.

The criteria for measuring aromatics compliance can pose additional obstacles to aromatics removal processes. The test for measuring aromatics compliance can be, in some regions, the FIA aromatics test (ASTM D1319), which classifies mono-aromatics and polycyclic aromatics equally as "aromatics." Hydrogenation to mono-aromatics is substantially less difficult than saturation of the final ring due to the resonance stabilization of the mono-aromatic ring. Due to these compliance requirements, hydrogenation to mono-aromatics is inadequate. Dearomatization objectives may not be met until a sufficient amount of the polycyclic aromatics and mono-aromatics are fully converted to saturated hydrocarbons.

While dearomatization may require a considerable capital investment on the part of most refiners, dearomatization can provide ancillary benefits. distillate aromatics content is inextricably related to cetane number, the accepted measure of diesel fuel quality. The cetane number is highly dependent on the paraffinicity of molecular structures, whether they are straight-chain or alkyl attachments to rings. A distillate stream which comprises mostly aromatic rings with few or no alkyl-side chains generally is of lower cetane quality material while a highly paraffinic stream is generally of higher cetane quality.

Dearomatization of refinery distillate streams can increase the volume yield of distillate products. Aromatic distillate components are generally lower in gravity than their similarly boiling paraffinic counterparts. Saturation of aromatic rings can convert these lower API gravity aromatic components to higher API gravity saturated components and expand the volume yield of distillate product.

Dearomatization of refinery distillate streams can also provide increased desulfurization and denitrogenation beyond ordinary levels attendant to distillate hydrogenation processes. Processes for the dearomatization of refinery distillate streams can comprise the construction of a new dearomatization facility, the addition of a second-stage dearomatization step to an existing distillate hydrogenation facility, or other processing options upstream of distillate hydrogenation or at the hydrogenation facility proper. These dearomatization steps can further reduce the nitrogen and sulfur concentrations of the distillate component and product streams, thus reducing desulfurization and denitrogenation catalyst and temperature requirements in existing distillate hydrogenation facilities designed primarily for hydrorefining. Reduced distillate sulfur and nitrogen concentrations can additionally increase the value of these streams for use as blending stocks to sulfur-constrained liquid fuel systems and as fluid catalytic cracking unit (FCC) feed.

While distillate dearomatization can provide cetane number improvement, volume expansion, and additional desulfurization and denitrogenation, the process has seldom been attractive in view of the large capital costs and the fact that many refiners have not reached distillate cetane limitations. Now that legislation exists and further legislation is being considered to mandate substantial reductions in distillate aromatics content, the demand for distillate dearomatization processes is now being largely determined by the incentive to continue marketing distillates.

The use of zeolite Y in catalyst supports for hydrogenation has met with limited success and is commerically rare in distillate dearomatization. Zeolite Y, and zeolite supports in general, have not been commonly used in hydrogenation processes because the crystal structure of the zeolite, in combination with common commercial hydrogenation metals, such as nickel, molybdenum, and cobalt, generally provides lower desulfurization activity, has a tendency to promote undersired hydrocracking reactions, and can be prone to early deactivation.

Hydrocracking processes utilizing catalyst supports comprising zeolite Y have been the subject of several patents. U.S. Pat. Nos. 3,197,398, 4,104,152, and 4,202,758 are particularly directed towards processes for hydrocracking distillate and gas oil streams.

U.S. Pat. No. 3,197,398 to Young, discloses a distillate and gas oil hydrocracking process using a catalyst comprising a group VIII metal (IUPAC) such as palladium on a crystalline alumino-silicate support such as zeolite Y or mordenite. The hydrocracking process and catalyst are designed to convert high-boiling mineral oil feedstocks to lower boiling products such as gasoline. Hydrocracking reactions are not desired and are avoided in the hydrogenation process and catalyst of the present invention because hydrocracking reduces liquid product yield, increases undesirable light gas make, increases catalyst deactivation rates, and reduces distillate product cetane numbers.

U.S. Pat. Nos. 3,736,252, 3,773,654, 3,943,053, 3,969,222, 4,014,783, 4,070,272, 4,610,779, and 4,960,505 are particularly directed towards processes for hydrogenating distillate fuels.

U.S. Pat. No. 4,610,779 to Markley et al, discloses a distillate hydrogenation process using a catalyst comprising a group VIII metal and zeolite Y. The process requires contacting a feedstock containing organic nitrogen compounds with the catalyst wherein the catalyst is partially deactivated. The activity of the catalyst is subsequently restored through a high temperature hydrogen treatment step. The hydrogenation process of Markley et al. provides adequate hydrogenation activity, but can tend to cause hydrocracking of the distillate feedstock and is not particularly resistant to catalyst deactivation. The ammonia addition and high temperature hydrogen treatment steps are also generally undesirable operating steps.

U.S. Pat. No. 4,960,505 to Minderhoud et al. discloses a distillate hydrogenation process using a catalyst comprising at least one Group VIII noble metal on a support having a unit cell size between 24.20 Å and 24.30 Å and a $SiO_2/Al_2O_3$ molar ratio of at least 25. The process limits hydrocracking of the final product to less than 50 wt % of the feedstock material boiling between the 90 wt % and Final Boiling Point of the feedstock. While the hydrogenation process of Minderhoud et al. can provide reduced hydrocracking over prior art processes such as that disclosed in Markley et al., the process provides average hydrogenation activity and is not particularly resistant to catalyst deactivation.

The use of metal mixtures on a catalyst support has also been the subject of research. (See P. N. Rylander, Catalytic Hydrogenation over Platinum Metals, Academic Press, New York 1967.) Rylander teaches that two platinum metal catalysts, when used together, can give better rates or better yields than either catalyst individually. However, except for certain selected examples, there seems to be no way of predicting when mixtures of catalysts will prove advantageous. A useful guide as to the probable effectiveness of coprecipitated metal catalysts, is the performance of a mechanical mixture of the two metals. (See Rylander, at pages 9–11.)

U.S. Pat. No. 3,943,053 to Kovach et al. discloses a hydrogenation process using a catalyst comprising a particular mixture of platinum and palladium on an inert oxide support such as beta, eta, or gamma alumina. The process provides gasoline and distillate hydrogenation, but with limited hydrogenation activity. The process avoids use of silica-alumina supports since use of silica-alumina in gasoline service can result in the conversion of high octane benzene into substantially lower octane cyclohexane.

We have surprisingly found that catalysts and processes having a catalyst incorporating metal mixtures of platinum and palladium onto a support comprising zeolite Y combined with a particularly targeted concentration of sodium, result in substantially improved hydrogenation compared to prior art hydrogenation processes including processes having a catalyst incorporating platinum and/or palladium on a support comprising zeolite Y with lower or higher than the particularly targeted sodium levels. We have also found that catalysts having sodium concentrations above the particularly targeted concentration provide similarly inferior performance. The distillate hydrogenation catalyst in accordance with the principles of the present invention is also more resistant to catalyst deactivation than the prior art catalysts, resulting in longer operating facility run lengths before catalyst replacement.

We have also found that processes having a catalyst incorporating metallic mixtures of platinum and palladium on a support comprising zeolite Y with a particularly targeted concentration of sodium, result in substantially improved hydrogenation compared to processes having a catalyst having platinum or palladium incorporated onto the same support alone. This particular synergy is more profound (and in contradistinction to the teachings of Rylander) since physical mixtures of platinum and palladium on a support comprising zeolite Y with the same particularly targeted concentration of sodium have been shown not to provide improved hydrogenation.

It is therefore an object of the present invention to provide a process and catalyst that provide improved distillate aromatics saturation.

It is an object of the present invention to provide a process and catalyst that provide improved distillate desulfurization and denitrogenation.

It is an object of the present invention to provide a process and catalyst that increase distillate cetane number.

It is an object of the present invention to provide a process and catalyst that expand the volume of the distillate feedstock.

Other objects appear herein.

SUMMARY OF THE INVENTION

The above objects can be obtained by providing a process for hydrogenation of a hydrocarbon feedstock consisting essentially of material boiling between about 150° F. and about 700° F. which comprises reacting the feedstock with hydrogen at hydrogenation conditions in the presence of a catalyst comprising hydrogenation metals and a support comprising zeolite Y. The hydrogenation metals comprise from about 0.1 percent to about 2.0 percent by weight each of palladium and platinum as a percentage of the catalyst. The zeolite Y further comprises sodium in an amount ranging from about 1.5 percent to about 8.0 percent of the zeolite Y by weight.

In another embodiment, the above objects can be obtained by providing a hydrogenation catalyst suitable for hydrogenation of a hydrocarbon feedstock comprising a support comprising zeolite Y and from about 0.1 percent to about 2.0 percent by weight each of palladium and platinum, each incorporated onto and calculated as a percentage of the hydrogenation catalyst. The palladium and platinum are present in the catalyst in a weight ratio ranging from about 5:1 to about 1:2. The zeolite Y further comprises sodium in an amount ranging from about 1.5 weight percent to about 8.0 weight percent as a percentage of the zeolite Y.

The process and catalyst of the present invention provide significant advantages over comparative processes such as those described in U.S. Pat. No.

3,943,053, which teaches distillate dearomatization using platinum and palladium on an alumina support. The process and catalyst of the present invention provide substantially improved dearomatization performance which permits petroleum refiners to meet future distillate product aromatics constraints at minimum cost.

The process and catalyst of the present invention provide increased desulfurization and denitrogenation over prior art processes. This improved desulfurization and denitrogenation can result in a reduction in first-stage hydrorefining catalyst or temperature requirements, increase the attractiveness of using desulfurized distillate to blend down plant fuel sulfur levels for $SO_2$ environmental compliance, and increase the attractiveness of catalytically cracking desulfurized distillates.

The process and catalyst of the present invention provide increased product cetane numbers over prior art processes. Improved distillate product cetane number can reduce costly cetane improver additive requirements and increase premium (high cetane) distillate production capacity.

The process and catalyst of the present invention provide increased distillate volume expansion to meet customer distillate demands at incrementally lower crude run.

BRIEF DESCRIPTION OF THE INVENTION

The distillate hydrocarbon feedstock processed in the present invention consists essentially of any one, several, or all refinery streams boiling in a range from about 150° F. to about 700° F., preferably 300° F. to about 700° F., and more preferably between about 350° F. and about 700° F. at atmospheric pressure. For the purpose of the present invention, the term "consisting essentially of" is defined as at least 95% of the feedstock by volume. The lighter hydrocarbon components in the distillate product are generally more profitably recovered to gasoline and the presence of these lower boiling materials in distillate fuels is often constrained by distillate fuel flash point specifications. Heavier hydrocarbon components boiling above 700° F. are generally more profitably processed as FCC feed and converted to gasoline. The presence of heavy hydrocarbon components in distillate fuels is further constrained by distillate fuel end point specifications.

The distillate hydrocarbon feedstock can comprise high and low sulfur virgin distillates derived from high- and low-sulfur crudes, coker distillates, catalytic cracker light and heavy catalytic cycle oils, and distillate boiling range products from hydrocracker and resid hydrotreater facilities. Generally, coker distillate and the light and heavy catalytic cycle oils are the most highly aromatic feedstock components, ranging as high as 80% by weight (FIA). The majority of coker distillate and cycle oil aromatics are present as mono-aromatics and di-aromatics with a smaller portion present as tri-aromatics. Virgin stocks such as high and low sulfur virgin distillates are lower in aromatics content ranging as high as 20% by weight aromatics (FIA). Generally, the aromatics content of a combined hydrogenation facility feedstock will range from about 5% by weight to about 80% by weight, more typically from about 10% by weight to about 70% by weight, and most typically from about 20% by weight to about 60% by weight. In a distillate hydrogenation facility with limited operating capacity, it is generally profitable to process feedstocks in order of highest aromaticity, since catalytic processes often proceed to equilibrium product aromatics concentrations at sufficient space velocity. In this manner, maximum distillate pool dearomatization is generally achieved.

The distillate hydrocarbon feedstock sulfur concentration is generally a function of the high and low sulfur crude mix, the hydrogenation capacity of a refinery per barrel of crude capacity, and the alternative dispositions of distillate hydrogenation feedstock components. The higher sulfur distillate feedstock components are generally virgin distillates derived from high sulfur crude, coker distillates, and catalytic cycle oils from fluid catalytic cracking units processing relatively higher sulfur feedstocks. These distillate feedstock components can range as high as 2% by weight elemental sulfur but generally range from about 0.1% by weight to about 0.9% by weight elemental sulfur. Where a hydrogenation facility is a two-stage process having a first-stage denitrogenation and desulfurization zone and a second-stage dearomatization zone, the dearomatization zone feedstock sulfur content can range from about 100 ppm to about 0.9% by weight or as low as from about 10 ppm to about 0.9% by weight elemental sulfur.

The distillate hydrocarbon feedstock nitrogen content is also generally a function of the nitrogen content of the crude oil, the hydrogenation capacity of a refinery per barrel of crude capacity, and the alternative dispositions of distillate hydrogenation feedstock components. The higher nitrogen distillate feedstocks are generally coker distillate and the catalytic cycle oils. These distillate feedstock components can have total nitrogen concentrations ranging as high as 2,000 ppm, but generally range from about 5 ppm to about 900 ppm.

Where the particular hydrogenation facility is a two-stage process, the first stage is often designed to desulfurize and denitrogenate, and the second stage is designed to dearomatize. In these operations, the feedstocks entering the dearomatization stage are substantially lower in nitrogen and sulfur content and can be lower in aromatics content than the feedstocks entering the hydrogenation facility.

The hydrogenation process of the present invention generally begins with a distillate feedstock preheating step. The feedstock is preheated in feed/effluent heat exchangers prior to entering a furnace for final preheating to a targeted reaction zone inlet temperature. The feedstock can be contacted with a hydrogen stream prior to, during, and/or after preheating. The hydrogen-containing stream can also be added in the hydrogenation reaction zone of a single-stage hydrogenation process or in either the first or second stage of a two-stage hydrogenation process.

The hydrogen stream can be pure hydrogen or can be in admixture with diluents such as hydrocarbon, carbon monoxide, carbon dioxide, nitrogen, water, sulfur compounds, and the like. The hydrogen stream purity should be at least about 50% by volume hydrogen, preferably at least about 65% by volume hydrogen, and more preferably at least about 75% by volume hydrogen for best results. Hydrogen can be supplied from a hydrogen plant, a catalytic reforming facility, or other hydrogen-producing processes.

The reaction zone can consist of one or more fixed bed reactors containing the same or different catalysts. Two-stage processes can be designed with at least one fixed bed reactor for desulfurization and denitrogenation, and at least one fixed bed reactor for dearomatization. A fixed bed reactor can also comprise a plurality of catalyst beds. The plurality of catalyst beds in a single fixed bed reactor can also comprise the same or different catalysts. Where the catalysts are different in a multi-bed fixed bed reactor, the initial bed or beds are generally for desulfurization and denitrogenation, and subsequent beds are for dearomatization.

Since the hydrogenation reaction is generally exothermic, interstage cooling, consisting of heat transfer devices between fixed bed reactors or between catalyst beds in the same reactor shell, can be employed. At least a portion of the heat generated from the hydrogenation process can often be profitably recovered for use in the hydrogenation process. Where this heat recovery option is not available, cooling may be performed through cooling utilities such as cooling water or air, or through use of a hydrogen quench stream injected directly into the reactors. Two-stage processes can provide reduced temperature exotherm per reactor shell and provide better hydrogenation reactor temperature control.

The reaction zone effluent is generally cooled and the effluent stream is directed to a separator device to remove the hydrogen. Some of the recovered hydrogen can be recycled back to the process while some of the hydrogen can be purged to external systems such as plant or refinery fuel. The hydrogen purge rate is often controlled to maintain a minimum hydrogen purity and remove hydrogen sulfide. Recycled hydrogen is generally compressed, supplemented with "make-up" hydrogen, and reinjected into the process for further hydrogenation.

The separator device liquid effluent can then be processed in a stripper device where light hydrocarbons can be removed and directed to more appropriate hydrocarbon pools. The stripper liquid effluent product is then generally conveyed to blending facilities for production of finished distillate products.

Operating conditions to be used in the hydrogenation process of the present invention include an average reaction zone temperature of from about 400° F. to about 750° F., preferably from about 500° F. to about 650° F., and most preferably from about 525° F. to about 625° F. for best results. Reaction temperatures below these ranges can result in less effective hydrogenation. Excessively high temperatures can cause the process to reach a thermodynamic aromatic reduction limit, hydrocracking, catalyst deactivation, and increase energy costs. Desulfurization, in accordance with the process of the present invention, can be less effected by reaction zone temperature than prior art processes, especially at feed sulfur levels below 500 ppm, such as in the second-stage dearomatization zone of a two-stage process.

The process of the present invention generally operates at reaction zone pressures ranging from about 400 psig to about 2,000 psig, more preferably from about 500 psig to about 1,500 psig, and most preferably from about 600 psig to about 1,200 psig for best results. Hydrogen circulation rates generally range from about 500 SCF/Bbl to about 20,000 SCF/Bbl, preferably from about 2,000 SCF/Bbl to about 15,000 SCF/Bbl, and most preferably from about 3,000 to about 13,000 SCF/Bbl for best results. Reaction pressures and hydrogen circulation rates below these ranges can result in higher catalyst deactivation rates resulting in less effective desulfurization, denitrogenation, and dearomatization. Excessively high reaction pressures increase energy and equipment costs and provide diminishing marginal benefits.

The process of the present invention generally operates at a liquid hourly space velocity of from about 0.2 hr$^{-1}$ to about 10.0 hr$^{-1}$, preferably from about 0.5 hr$^{-1}$ to about 3.0 hr$^{-1}$, and most preferably from about 1.0 hr$^{-1}$ to about 2.0 hr$^{-1}$ to best results. Excessively high space velocities will result in reduced overall hydrogenation.

The process and catalyst of the present invention comprise a catalyst having a hydrogenation component and a catalyst support.

The catalyst support component of the present invention comprises zeolite Y and a refractory inorganic oxide such as silica, alumina, or silica-alumina. The zeolite Y component is present in the support in an amount ranging from about 10% by weight to about 90% by weight, preferably from about 40% by weight to about 85% by weight, and most preferably from about 50% by weight to about 80% by weight for best results. High zeolite Y concentrations in the support can adversely result in increased hydrocracking activity. The refractory inorganic oxide, suitable for use in the present invention, has a pore diameter ranging from about 50 to about 200 Angstroms and more preferably from about 80 to about 150 Angstroms for best results.

Zeolite Y is a synthetic analog of the mineral faujasite and has the same three-dimensional pore structure. The pore openings are defined by nearly circular rings of 12 oxygen atoms giving a pore diameter of about 7 angstroms. The internal pores have nearly spherical cavities that are about 12 angstroms in diameter.

Zeolite Y is defined in detail in U.S. Pat. No. 3,130,007 to Breck, the teachings of which are hereby incorporated by reference. While zeolite Y is defined as having a silicon to aluminum atomic ratio in the framework (the rigid, three-dimensional, crystalline portion of the material) of from about 1.5 to about 3.0, most commercial zeolite Y compositions have a silicon to aluminum atomic ratios ranging from about 2.4 to about 2.5 as synthesized. Generally, sodium is the exchangeable cation in faujasite, although small amounts of other cations can be employed along with the sodium in the synthesis. A typical unit cell formula for the zeolite Y used in accordance with the present invention is:

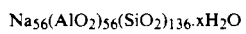

$$Na_{56}(AlO_2)_{56}(SiO_2)_{136}\cdot xH_2O$$

The sodium content of most commercial zeolite Y compositions ranges from about 9 wt % to about 10 wt % as a percentage of the anhydrous zeolite Y.

The hydrogenation catalyst and process of the present invention necessitates adjustment of the sodium content of the zeolite Y to a concentration range of from about 1.5 wt % to about 8.0 wt % as a percentage of the zeolite Y, preferably from about 1.5 wt % to about 6.0 wt %, and more preferably from about 1.5 wt % to about 5.0 wt % for best results. Reduction in the sodium concentration, from zeolite Y having higher sodium concentrations to the targeted concentration, is generally achieved by replacement of sodium ions with ammonium ions followed by decomposition of the ammonium form by calcination. Chemical analysis of the calcined product of the ammonium form of zeolite Y generally shows that complete decomposition of the ammonium ion has occurred, yet the X-ray pattern of the product is generally the same as that of the original ammonium form. Thus, little if any destruction of the crystalline alumino-silicate lattice is detected.

While zeolite Y is the preferred component for use in the catalyst and process of the present invention, US-Y, having substantially lower sodium concentrations, may be utilized, and sodium back-added to the composition. US-Y can be and is generally produced by ion exchange and steam treatment of zeolite Y. A general procedure for preparing a US-Y catalyst can and generally includes ion exchange of the zeolite Y with an ammonium salt until the sodium content is below about 3 wt % as a percentage of the zeolite Y. The ion exchanged zeolite Y is then generally calcined in the presence of water at above 500° C. for a period of from about 1 hour to about 12 hours. The calcined zeolite Y is then generally ion exchanged again to reduce the sodium content to about 0.3 wt % and preferably less than about 0.1 wt % as a percentage of the zeolite Y on a dry basis. During the calcining step, the unit cell parameter, or the length of the side of the cubic unit cell, decreases from about 24.70 angstroms to about 24.55 angstroms, indicating dealumination of the framework. The framework silicon to aluminum atomic ratio is generally increased from about 2.4 to about 3.6 during these steps. The total aluminum content is generally unchanged since the aluminum that leaves the framework remains in the pores of the zeolite.

To produce a catalyst suitable for use in the present invention, sodium can be back-added to zeolite Y or US-Y by impregnation employing heat-decomposable salts of sodium or other methods known to those skilled in the art such as ion-exchange, with impregnation being preferred. Other suitable exchangeable cations, in addition to sodium, can be added to the catalyst of the present invention. Suitable exchangeable cations can include the alkali metals and the alkali earth metals and preferably lithium, potassium, barium, calcium, and magnesium. Suitable aqueous impregnation solutions can include, but are not limited to sodium nitrate and sodium acetate.

Impregnation using sodium nitrate or sodium acetate can begin with precalcining the zeolite Y or US-Y in preparation for using incipient wetness techniques. Under common incipient wetness techniques, a determination is generally made as to the amount of water required to saturate and fill the pores of the zeolite Y or US-Y. A solution is then prepared utilizing the predetermined amount of water and a sufficient amount of the sodium salt to provide a zeolite Y or US-Y component having the desired concentration of sodium. The impregnated zeolite Y or US-Y is then separated, drained, and dried in preparation for calcining. Calcination is generally performed at a temperature ranging from about 932° F. to about 1,202° F., or more preferably from about 977° F. to about 1,067° F.

The zeolite Y utilized in the catalyst of the present invention can be dealuminized to a silicon to aluminum atomic ratio in the framework ranging from about 3:1 to about 20:1, preferably from about 3:1 to about 10:1, and most preferably from about 3:1 to about 7:1 for best results. For purpose of the present invention, a silicon to aluminum atomic ratio of 5 is equivalent to a silica to alumina molar ratio of 10. Silicon to aluminum atomic ratio range above 20 can provide less effective dearomatization. Suitable zeolite Y compositions for use as starting materials in producing the catalyst of the present invention are LZ-Y52 and LZ-Y62, manufactured by the Linde Division of UOP.

Processes for the dealumination of zeolites such as zeolite Y are well known. Generally, zeolite dealumination is accomplished by chemical methods such as treatments with acids, e.g., HCl, with volatile halides, e.g., $SiCl_4$, or with chelating agents such as ethylenediaminetetraacetic acid (EDTA). Another common technique is a hydrothermal treatment of the zeolite Y in either pure steam or in air/steam mixtures.

The final calcined catalyst used in the present invention comprises a hydrogenation component consisting essentially of palladium and platinum. These metals can be present in the catalyst in their elemental form or as their oxides, sulfides, or mixtures thereof. The palladium and platinum are each generally present in an amount ranging from about 0.1 percent by weight to about 2.0 percent by weight, preferably from about 0.2 percent by weight to about 1.5 percent by weight, and more preferably from about 0.3 percent by weight to about 1.2 percent by weight based on the total weight of the catalyst and calculated as oxide, for best results. Catalyst metals contents outside of these total metals content ranges can be less economic. Higher metals contents can require more total hydrogenation component due to reduced dispersion and feed/catalyst contact. Lower metals contents can result in increased support material, catalyst handling, transportation, and capital costs.

The weight ratio of elemental palladium to elemental platinum generally ranges from about 10:1 to 1:10, preferably from about 5:1 to 1:2, and more preferably from about 3:1 to 1:1 for best results. Foregoing one of the hydrogenation metals or using a mixture outside of the weight ratio ranges can result in less effective hydrogenation.

The hydrogenation component can be deposed or incorporated upon the support by impregnation employing heat-decomposable salts of platinum and palladium or other methods known to those skilled in the art such as ion-exchange, with impregnation methods being preferred. The platinum and palladium can be impregnated onto the support separately, or can be co-impregnated onto the support. Suitable aqueous impregnation solutions include, but are not limited to, chloroplatinic acid, palladium chloride, tetrammine palladium chloride, and tetrammine platinum chloride.

Impregnation using tetrammine palladium chloride and tetrammine platinum chloride can be performed by precalcining the catalyst support, in the form of a powder, pellets, extrudates, or spheres and determining the amount of water that must be added to wet all of the material. The tetrammine palladium chloride and tetrammine platinum chloride are then dissolved in the calculated amount of water, and the solution added to the support in a manner such that the solution completely saturates the support. The tetrammine palladium chloride and tetrammine platinum chloride are added in a manner such that the aqueous solution contains the total amount of elemental palladium and platinum to be deposited on the given mass of support. Impregnation can be performed for each metal separately, including an intervening drying step between impregnations, or as a single co-impregnation step. The saturated support can then be separated, drained, and dried in preparation for calcining. Commercially, draining volumes can be reduced in order to reduce palladium and platinum losses and waste water handling costs, by providing less than the full amount of aqueous solution (such as from 90% to 100% by volume of aqueous solution) necessary to saturate all of the support. Calcination generally is performed at a temperature of from about 932° F. to about 1,202° F., or more preferably from about 977° F. to about 1,067° F.

It has been surprisingly found that catalysts and processes having a catalyst incorporating metal mixtures of platinum and palladium onto a support comprising zeolite Y combined with the particularly targeted concentration ranges of sodium described herein, result in substantially improved hydrogenation compared to hydrogenation processes including processes having a catalyst incorporating platinum and/or palladium on a support comprising zeolite Y with lower or higher sodium levels. While not wishing to be bound to any theory, the optimum sodium content may achieve these superior results in part due to catalyst acidity control. Calcination of ammonium-containing zeolites drives off ammonia and leaves behind protons (Bronsted acids). A proper and critical balance between hydrogenation activity, provided by the palladium and platinum, and cracking-isomerization activity, provided by the protons, may be a key to the superior catalyst and process performance. Hydrogen that is activated or dissociated on the palladium and platinum sites may be transferred to the aromatics through the proton sites. In this manner and under this mechanism, insufficient proton sites would reduce saturation activity and too many proton sites would lead to undesirable side reactions. This phenomena may be partly responsible for the surprising end unexpected results.

The finished hydrogenation catalyst is particularly durable and resilient to conditions encountered in typical petroleum refineries. Catalyst durability is commonly measured by crush strength. The crushing strength of the catalyst is determined by placing a catalyst pill on its side between two parallel, horizontal flat plates, one stationary and one movable. A gradually increasing force is applied to the movable plate, perpendicular to the surface of the plate, until the pill breaks. The crushing strength for purpose of the present invention is the force, in pounds, applied at the instant of pill breakage divided by the length of the particular extrudate particle in millimeters. The reported crushing strength is generally the average value determined on 100 pills. The hydrogenation catalyst suitable for use in the present invention should have a crush strength for cylinder extrudate particles of 1/16 inches, of greater than 0.1 lb/mm, preferably greater than 0.2 lb/mm, and more preferably greater than 0.4 lb/mm for best results. High catalyst crush strengths can reduce catalyst breakage and replacement costs.

The process and catalyst of the present invention comprising hydrogenation of a distillate boiling range feedstock utilizing a catalyst comprising palladium and platinum and a support comprising zeolite Y with a particularly targeted concentration of sodium, provides superior dearomatization performance. Dearomatization performance is generally measured by the percentage of aromatics saturated, calculated as the weight percentage of aromatics in the hydrogenation process product subtracted from the weight percentage of aromatics in the feedstock divided by the weight percentage of aromatics in the feedstock. The hydrogenation process in accordance with the principles of the present invention can generally attain and sustain aromatics saturation levels of greater than 20 percent, greater than 50 percent, and as high as or higher than 80 percent. This high level of aromatics saturation provides for a hydrogenation process that can operate at less severe and costly operating conditions, prolonging catalyst life.

The hydrogenation process and catalyst of the present invention provide outstanding desulfurization and denitrogenation performance. The hydrogenation process in accordance with the principles of the present invention can generally attain product sulfur levels below 100 ppm, below 90 ppm, and below 50 ppm. The hydrogenation process in accordance with the principles of the present invention can generally attain product nitrogen levels below 5 ppm, below 3 ppm, and as low as 1 ppm. This level of desulfurization and denitrogenation can result in a reduction in first-stage hydrorefining catalyst requirements, increase the attractiveness of using desulfurized distillate to blend down plant fuel sulfur levels for $SO_2$ environmental compliance, and increase the attractiveness of catalytically cracking desulfurized distillates.

The hydrogenation process and catalyst of the present invention provide a substantial increase in distillate product cetane number. Higher fluid catalytic cracking severity has resulted in FCC distillate products having lower cetane numbers, adding cetane limitations in refinery distillate pools that previously may not have existed. The hydrogenation process in accordance with the principles of the present invention can generally achieve product cetane number improvements of over 5 numbers, over 6 numbers, and as high as 10 numbers. Improved cetane production can reduce costly cetane improver additive requirements and increase premium (high cetane) distillate production capacity.

The hydrogenation process and catalyst of the present invention provide substantial distillate volume expansion. Distillate volume expansion is generally measured by the reduction in specific gravity across the hydrogenation process and is calculated as the specific gravity of the hydrogenation process product subtracted from the specific gravity of the feedstock divided by the specific gravity of the feedstock. The hydrogenation process in accordance with the principles of the present invention can expand the volume of the distillate feedstock by more than 2.4 percent, more than 3.0 percent, and more than 4.4 percent. Volume expansion across a distillate hydrogenation process can permit petroleum refiners to meet customer distillate demands at incrementally lower crude run.

The hydrogenation catalyst of the present invention is durable and resilient. The hydrogenation catalyst used in the process of the present invention has a crush strength generally comparable to that utilized in prior art processes. A more durable hydrogenation catalyst prolongs catalyst life and reduces catalyst replacement costs.

The present invention is described in further detail in connection with the following examples, it being understood that the same are for purposes of illustration and not limitation.

EXAMPLE 1

A zeolite Y with sodium-based hydrogenation catalyst was prepared from an as-synthesized form of zeolite Y, brand number LZ-Y52, purchased from the Linde Division of Union Carbide (now UOP). The as-synthesized zeolite Y contained 11.4% by weight aluminum and 9.6% by weight sodium. The unit cell parameter was 24.68 Å and the silicon to aluminum atomic ratio was about 2.5:1.

The as-synthesized zeolite Y was co-impregnated with hydrogenation metals using incipient wetness techniques. The amount of water required to saturate and fill the pores of the as-synthesized zeolite Y was determined and an aqueous solution was prepared with this amount of water and a sufficient amount of tetrammine palladium chloride and tetrammine platinum chloride to provide a hydrogenation catalyst having 0.25 wt% elemental palladium and 0.25 wt% elemental platinum. The co-impregnated zeolite Y component was dried for 12 hours at 250° F., mixed with a sufficient amount of gamma alumina sol to provide a catalyst containing 60% zeolite Y and 40% alumina on an anhydrous basis, homogenized, and dried for 12 hours at 250° F. The zeolite Y with sodium-based hydrogenation catalyst was extruded into 1/16 inch extrudates, dried for 12 hours at 250° F., and calcined at 1,000° F. for 3 hours.

The catalyst was designated as Catalyst 1 and the composition and properties of the catalyst are specified in Table II.

EXAMPLE 2

A zeolite Y with sodium-based hydrogenation catalyst was prepared in a manner similar to that described in Example 1. Prior to metals co-impregnation, the as-synthesized zeolite Y was ammonium exchanged with a solution of 500 g of as-synthesized zeolite Y, 25 g of ammonium nitrate, and 5,000 cc of water in order to remove sodium. The mixture was mixed for 40 minutes, filtered, washed, and dried for 12 hours at 250° F. The ammonium exchanged zeolite Y had a sodium content of 8.5% by weight.

The ammonium exchanged zeolite Y was co-impregnated with palladium and platinum in a manner so as to provide a hydrogenation catalyst having 0.25 wt % elemental palladium and 0.25 wt % elemental platinum as described in Example 1. The catalyst was designated as Catalyst 2 and the composition and properties of the catalyst are specified in Table II.

EXAMPLE 3

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 50 g of ammonium nitrate, and 5,000 cc of water in order to remove sodium. The mixture was mixed for 40 minutes, filtered, washed, and dried for 12 hours at 250° F. The ammonium exchanged zeolite Y had a sodium content of 7.6% by weight.

The ammonium exchanged zeolite Y was co-impregnated with palladium and platinum in a manner so as to provide a hydrogenation catalyst having 0.25 wt % elemental palladium and 0.25 wt % elemental platinum as described in Example 1. The catalyst was designated as Catalyst 3 and the composition and properties of the catalyst are specified in Table II.

EXAMPLE 4

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 100 g of ammonium nitrate, and 5,000 cc of water in order to remove sodium. The mixture was mixed for 1 hour, filtered, washed, and dried for 12 hours at 250° F. The ammonium exchanged zeolite Y had a sodium content of 5.7% by weight.

The ammonium exchanged zeolite Y was co-impregnated with palladium and platinum in a manner so as to provide a hydrogenation catalyst having 0.25 wt % elemental palladium and 0.25 wt % elemental platinum as described in Example 1. The crush strength of the catalyst was determined to be 0.35 lb/mm. The catalyst was designated as Catalyst 4 and the composition and properties of the catalyst are specified in Table II.

EXAMPLE 5

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 500 g of ammonium nitrate, and 5,000 cc of water in order to remove sodium. The mixture was mixed for 4 hours, filtered, washed, and dried for 12 hours at 250° F. The ammonium exchanged zeolite Y had a sodium content of 3.1% by weight.

The ammonium exchanged zeolite Y was co-impregnated with palladium and platinum in a manner so as to provide a hydrogenation catalyst having 0.25 wt % elemental palladium and 0.25 wt % elemental platinum as described in Example 1. The catalyst was designated as Catalyst 5 and the composition and properties of the catalyst are specified in Table II.

EXAMPLE 6

A zeolite Y with sodium-based hydrogenation catalyst was prepared in a manner similar to that described in Example 2. Prior to metals co-impregnation, the as-synthesized zeolite Y was ammonium exchanged twice with a solution of 500 g of as-synthesized zeolite Y, 500 g of ammonium nitrate, and 5,000 cc of water in order to remove sodium. The mixture was mixed for 4 hours between exchanges, allowed to settle, and decanted. After the second 4 hour ammonium exchange, the mixture was filtered, washed, and dried for 12 hours at 250° F. The twice ammonium exchanged zeolite Y had a sodium content of 2.5% by weight.

The ammonium exchanged zeolite Y was co-impregnated with palladium and platinum in a manner so as to provide a hydrogenation catalyst having 0.25 wt % elemental palladium and 0.25 wt % elemental platinum as described in Example 1. The catalyst was designated as Catalyst 6 and the composition and properties of the catalyst are specified in Table II.

EXAMPLE 7

A zeolite Y with sodium-based hydrogenation catalyst was prepared from a commercial ammonium exchanged form zeolite Y, brand number LZ-Y62, purchased from the Linde Division of Union Carbide. The purchased ammonium exchanged zeolite Y contained 12.0% by weight Aluminum and 1.8% by weight sodium. The unit cell parameter was 24.71 Å and the silicon to aluminum atomic ratio was about 2.4:1.

The commercial ammonium exchanged zeolite Y was co-impregnated with palladium and platinum in a manner so as to provide a hydrogenation catalyst having 0.25 wt % elemental palladium and 0.25 wt % elemental platinum as described in Example 1. The catalyst was designated as Catalyst 7 and the composition and properties of the catalyst are specified in Table II.

EXAMPLE 8

Comparative hydrogenation catalysts were prepared for comparison with the hydrogenation catalysts of the present invention (Examples 8-9).

Gamma alumina was extruded into 1/16-inch extrudates, dried at 250° F. for 12 hours, and calcined at 1,000° F. for 10 hours. The hydrogenation catalyst was co-impregnated with an aqueous solution of a sufficient amount of tetrammine palladium chloride and tetrammine platinum chloride in water to provide a hydrogenation catalyst having 0.25 wt % elemental palladium and 0.25 wt % elemental platinum. The hydrogenation catalyst was dried for 12 hours at 250° F. and calcined at 1,000° F. for 4 hours. The catalyst was designated as Catalyst 8 and the composition and properties of the catalyst are specified in Table II.

EXAMPLE 9

Gamma alumina was extruded into 1/16-inch extrudates, dried at 250° F. for 12 hours, and calcined at 1,000° F. for 10 hours. The hydrogenation catalyst was co-impregnated with an aqueous solution of a sufficient amount of tetrammine palladium chloride and tetrammine platinum chloride in water to provide a hydrogenation catalyst having 0.35 wt % elemental palladium and 0.15 wt % elemental platinum. The hydrogenation catalyst was dried for 12 hours at 250° F. and calcined at 1,000° F. for 4 hours. The crush strength of the catalyst was determined to be 0.35 lb/mm. The catalyst was designated as Catalyst 9 and the composition and properties of the catalyst are specified in Table II.

EXAMPLE 10

Zeolite Y with sodium-based hydrogenation catalysts having varying amounts of palladium and platinum were prepared for comparision with comparative hydrogenation Catalysts 8 and 9 and zeolite Y with sodium-based Catalysts 1 through 7.

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 500 g of ammonium nitrate, and 5,000 cc of water in order to remove sodium. The mixture was mixed for 4 hours, filtered, washed, and dried for 12 hours at 250° F. The ammonium exchanged zeolite Y had a sodium content of 3.1% by weight.

The ammonium exchanged zeolite Y component was impregnated with an aqueous solution of a sufficient amount of tetrammine platinum chloride in water to provide a hydrogenation catalyst having 0.5 wt % elemental platinum. The hydrogenation catalyst was dried for 12 hours at 250° F. and calcined at 1,000° F. for 3 hours. The catalyst was designated as Catalyst 10 and the composition and properties of the catalyst are specified in Table II.

EXAMPLE 11

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 500 g of ammonium nitrate, and 5,000 cc of water in order to remove sodium. The mixture was mixed for 4 hours, filtered, washed, and dried for 12 hours at 250° F. The ammonium exchanged zeolite Y had a sodium content of 3.1% by weight.

The ammonium exchanged zeolite Y component was impregnated with an aqueous solution of a sufficient amount of tetrammine palladium chloride in water to provide a hydrogenation catalyst having 0.5 wt % elemental palladium. The hydrogenation catalyst was dried for 12 hours at 250° F. and calcined at 1,000° F. for 3 hours. The catalyst was designated as Catalyst 11 and the composition and properties of the catalyst are specified in Table II.

EXAMPLE 12

A zeolite Y with sodium-based hydrogenation catalyst was prepared as a 50%/50% physical mixture of the zeolite Y with sodium-based hydrogenation catalysts of Examples 10 and 11. The catalyst was designated as Catalyst 12 and the composition and properties of the catalyst are specified in Table II.

EXAMPLE 13

A zeolite Y with sodium-based hydrogenation catalyst was prepared in a manner similar to that described in Example 2. Prior to metals co-impregnation, the as-synthesized zeolite Y was ammonium exchanged with a solution of 500 g of as-synthesized zeolite Y, 500 g of ammonium nitrate, and 5,000 cc of water in order to remove sodium. The mixture was mixed for 4 hours, filtered, washed, and dried for 12 hours at 250° F. The ammonium exchanged zeolite Y had a sodium content of 3.1% by weight.

The ammonium exchanged zeolite Y was co-impregnated with palladium and platinum in a manner so as to provide a hydrogenation catalyst having 1.05 wt % elemental palladium and 0.30 wt % elemental platinum. The hydrogenation catalyst was dried for 12 hours at 250° F. and calcined at 1,000° F. for 3 hours. The catalyst was designated as Catalyst 13 and the composition and properties of the catalyst are specified in Table II.

EXAMPLE 14

A zeolite Y with sodium-based hydrogenation catalyst was prepared in a manner similar to that described in Example 13 but for an increase in the percentage of the zeolite Y component. The co-impregnated zeolite Y component was mixed with a sufficient amount of gamma alumina sol to provide a catalyst containing 80% zeolite Y and 20% alumina on an anhydrous basis and 1.05 wt % elemental palladium and 0.30 wt % elemental platinum. The catalyst was designated as Catalyst 14 and the composition and properties of the catalyst are specified in Table II.

EXAMPLE 15

A feedstock consisting of hydrogenated light catalytic cycle oil was prepared from light catalytic cycle oil obtained from the Amoco Oil Texas City Refinery. The light catalytic cycle oil was hydrotreated in a high-pressure trickle-bed unit at a pressure of 300 psig and a temperature of 600° F., to a sulfur level of 378 ppm. The hydrotreated light catalytic cycle oil properties are described in Table I.

TABLE 1

| FEEDSTOCK PROPERTIES | |
|---|---|
| API Gravity | 24.0 |
| Mass Spec Analysis, wt %* | |
| Saturates | 33.2 |

TABLE 1-continued
FEEDSTOCK PROPERTIES

| | |
|---|---|
| Aromatics | 66.8 |
| Mono- | 37.9 |
| Di- | 24.6 |
| Tri- | 4.3 |
| FIA Aromatics (ASTM D 1319) | 62.0 |
| Elemental Analysis (ASTM C-730) | |
| Carbon, wt % | 88.75 |
| Hydrogen wt % | 11.06 |
| Sulfur, ppm | 378 |
| Nitrogen, ppm | 165 |
| H/C, Mole Ratio | 1.48 |
| Cetane Number (calc.) | 31.2 |

*Published in Analytical Chemistry, 43(11), pages 1425-1434 (1971)

EXAMPLE 16

The feedstock of Example 15 was hydrogenated over the catalysts produced in Examples 1 through 14. Catalyst performance was evaluated using a bench scale, isothermal reactor having a ¾ inch internal diameter and a thermowell. Operation was downflow with once-through hydrogen and oil. Each catalyst was used in the form of 1/16 inch extrudates and each catalyst charge was approximately 20 g. The catalyst was supported near the center of the reactor on a layer of 3 mm Pyrex glass beads, and a preheat zone of 5 mm beads was provided above the catalyst bed.

Each catalyst was pretreated prior to testing by injecting hydrogen through the reactor at a flowrate of 0.6 SCFH for 2 hours. Reactor conditions were maintained at 600° F. and 1,200 psig during the pretreatment step. Operating conditions for the runs were approximately a pressure of 1,200 psig, a temperature of 600° F., an hourly space velocity ($WHSV^{-1}$) $1.0^1$, and a hydrogen injection rate of 4,000 SCF/Bbl.

Over each 24-hour period, at least a 6-hour sample of product was collected in a nitrogen-purged receptacle. Nitrogen purging was performed to remove hydrogen sulfide. The product was analyzed for API gravity, sulfur content (elemental) by X-ray fluorescence, nitrogen content, aromatics content by Mass Spec. Analysis as published in *Analytic Chemistry*, 43(11), pages 1425-1434 (1971), and hydrogen to carbon ratio. Process and product calculations were performed to measure percent aromatics saturation, percent volume expansion, and product cetane number. The cetane number was provided by an empirical correlation which determines cetane number from product properties such as API gravity and the boiling point temperature at which 50 vol % of the distillate feed or product stream is vaporized.

The catalyst composition, process conditions, product properties, and process calculations for each of the catalysts described in Examples 1 through 14 are specified in Table II.

TABLE 2
DISTILLATE DEAROMATIZATION

| Catalyst | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Catalyst Composition | | | | | | | | | | | | | | |
| Support Material | Y | Y | Y | Y | Y | Y | Y | Alum | Alum | Y | Y | Y | Y | Y |
| Zeol. Y Si:Al Atomic Ratio | 2:5:1 | 2:5:1 | 2:5:1 | 2:5:1 | 2:5:1 | 2:5:1 | 2:4:1 | N/A | N/A | 2:5:1 | 2:5:1 | 2:5:1 | 2:5:1 | 2:5:1 |
| Sodium, wt. % (ppm) | 9.6 | 8.5 | 7.6 | 5.7 | 3.1 | 2.5 | 1.8 | (4) | (4) | 3.1 | 3.1 | 3.1 | 3.1 | 3.1 |
| Palladium, wt. % | 0.25 | 0.25 | 0.25 | 0.25 | 0.25 | 0.25 | 0.25 | 0.25 | 0.35 | 0.00 | 0.50 | $0.25^1$ | 1.05 | 1.05 |
| Platinum, wt. % | 0.25 | 0.25 | 0.25 | 0.25 | 0.25 | 0.25 | 0.25 | 0.25 | 0.15 | 0.50 | 0.00 | $0.25^1$ | 0.30 | 0.30 |
| Sieve Conc. In Support, wt. % | 60 | 60 | 60 | 60 | 60 | 60 | 60 | 0 | 0 | 60 | 60 | 60 | 60 | 80 |
| Process Conditions | | | | | | | | | | | | | | |
| Temperature, °F. | 600 | 600 | 600 | 600 | 600 | 600 | 600 | 600 | 600 | 600 | 600 | 600 | 600 | 600 |
| Pressure, psig | 1200 | 1200 | 1200 | 1200 | 1200 | 1200 | 1200 | 1200 | 1200 | 1200 | 1200 | 1200 | 1200 | 1200 |
| Hydrogen Rate, SCF/Bbl | 4000 | 4000 | 4000 | 4000 | 4000 | 4000 | 4000 | 4000 | 4000 | 4000 | 4000 | 4000 | 4000 | 4000 |
| $WHSV^{-1}$ | 1.0 | 1.0 | 1.0 | 1.0 | 1.0 | 1.0 | 1.0 | 1.0 | 1.0 | 1.0 | 1.0 | 1.0 | 1.0 | 1.0 |
| Product Properties and Process Calculations | | | | | | | | | | | | | | |
| API Gravity | 26.6 | 26.3 | 28.9 | 27.8 | 32.9 | 32.4 | 31.3 | 27.5 | 27.7 | 27.2 | 32.3 | 27.6 | 34.3 | $40.1^2$ |
| Sulfur, ppm | 139 | 161 | 45 | 89 | 17 | 28 | 31 | 97 | 81 | 130 | 19 | 169 | 14 | 5 |
| Nitrogen, ppm | 26 | 3 | 1 | 1 | 1 | 1 | 1 | 27 | 26 | 6 | 1 | 1 | 1 | 1 |
| Aromatics, wt. % | 54.5 | 55.8 | 39.1 | 45.9 | 9.9 | 26.7 | 36.6 | 49.6 | 49.4 | 53.9 | 16.1 | 55.2 | 3.1 | 1.2 |
| % Aromatic Saturation | 12 | 10 | 37 | 26 | 84 | 57 | 41 | 20 | 26 | 13 | 74 | 11 | 95 | 98 |
| H/C Ratio, mole | 1.61 | 1.61 | 1.69 | 1.64 | 1.89 | 1.77 | 1.72 | 1.63 | 1.65 | 1.61 | 1.82 | 1.63 | 1.89 | 1.94 |
| Volume Expansion, % | 1.6 | 1.5 | 3.1 | 2.4 | 5.4 | 5.1 | 4.5 | 2.2 | 2.3 | 2.0 | 5.1 | 2.3 | 6.2 | $9.4^2$ |
| Cetane Number, calc. | 34.7 | 34.3 | 37.9 | 36.4 | 44.0 | 43.2 | 41.5 | 35.9 | 36.2 | 35.5 | 43.0 | 36.1 | 46.2 | $56.1^2$ |
| Crush Strength, | | | | 0.35 | | | | | | | 0.35 | | | |

TABLE 2-continued

DISTILLATE DEAROMATIZATION

| Catalyst | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| lb/mm | | | | | | | | | | | | | | |

[1] Physical Mixture of Pd/Pt
[2] Effect of Hydrocracking Reactions

Catalyst 1 having 0.25 wt % palladium and 0.25 wt % platinum, on a support comprising zeolite Y having a sodium content of 9.6 wt %, provided poor dearomatization performance, desulfurization, denitrogenation, volume expansion, and cetane number improvement.

Catalyst 2 having 0.25 wt % palladium and 0.25 wt % platinum, on a support comprising zeolite Y having a reduced sodium content of 8.5 wt %, provided similarly poor dearomatization performance, desulfurization, denitrogenation, volume expansion, and cetane number improvement.

Catalyst 3 having 0.25 wt % palladium and 0.25 wt % platinum on a support comprising zeolite Y having a reduced sodium content of 7.6 wt %, provided above average desulfurization and cetane number improvement. Dearomatization performance and volume expansion was average. Denitrogenation performance was outstanding. All performance parameters measured for Catalyst 3 utilizing a zeolite Y support comprising 7.6% sodium were vastly improved over processes utilizing Catalysts 1 and 2 having higher levels of sodium.

Catalyst 4 having 0.25 wt % palladium and 0.25 wt % platinum, on a support comprising zeolite Y having a reduced sodium content of 5.7 wt %, provided average dearomatization performance, desulfurization, volume expansion, and cetane number improvement performance. Denitrogenation performance was outstanding. Catalyst 4 was slightly less effective than Catalyst 3 but a substantial improvement over Catalysts 1 and 2.

Catalyst 5 having 0.25 wt % palladium and 0.25 wt % platinum, on a support comprising zeolite Y having a reduced sodium content of 3.1 wt %, provided outstanding dearomatization performance, desulfurization, denitrogenation, and cetane number improvement. Volume expansion was well above average. All performance parameters measured for Catalyst 5 were outstanding or near outstanding and substantially improved over Catalysts 1 through 4.

Catalyst 6 having 0.25 wt % palladium and 0.25 wt % palladium, on a support comprising zeolite Y having a reduced sodium content of 2.5 wt %, provided outstanding denitrogenation and cetane number improvement and above average dearomatization performance, desulfurization, and volume expansion. All performance parameters measured for Catalyst 6 were above average or outstanding and although slightly less effective than Catalyst 5, Catalyst 6 is a substantial improvement over Catalysts 1 through 4.

Catalyst 7 having 0.25 wt % palladium and 0.25 wt % platinum , on a support comprising zeolite Y having a reduced sodium content of 1.8 wt %, provided outstanding denitrogenation and above average dearomatization performance, desulfurization, cetane number improvement, and volume expansion. Catalyst 7 was slightly inferior to Catalysts 5 and 6 but a substantial improvement compared to Catalysts 1 through 4.

Catalyst 8, a comparative hydrogenation catalyst was tested having 0.25 wt % palladium and 0.25 wt % platinum on a support comprising gamma alumina having about 4 ppm of sodium. The catalyst exhibited below average dearomatization performance, desulfurization, cetane number improvement, and volume expansion. Denitrogenation performance was poor. Catalyst 8 having an alumina support with minimal sodium content was less effective than zeolite Y Catalysts 3 through 7 having particularly targeted sodium concentrations of between about 1.5 wt % and 8.0 wt %, and slightly more effective than Catalysts 1 and 2 having higher amounts of sodium.

Catalyst 9, a comparative hydrogenation catalyst was tested having 0.35 wt % palladium and 0.15 wt % platinum on a support comprising gamma alumina having about 4 ppm of sodium. The catalyst exhibited average dearomatization performance, desulfurization, and cetane number improvement and below average volume expansion. Denitrogenation performance was poor. Catalyst 9 having an alumina support with minimal sodium content and a higher percentage of palladium than platinum was more effective than comparative Catalyst 8 having equal percentages of palladium and platinum and less effective than Catalysts 3 through 7 having particularly targeted sodium concentrations of between about 1.5 wt % and 8.0 wt %. Catalyst 9 was more effective than Catalysts 1 and 2 having higher amounts of sodium.

Catalyst 10 having 0.50 wt % platinum and no palladium, on a support comprising zeolite Y having a sodium content of 3.1 wt %, provided below average dearomatization performance, desulfurization, and denitrogenation and poor cetane number improvement and volume expansion. Catalyst 10, absent palladium, was less effective than Catalysts 3 through 7 having particularly targeted sodium concentrations of between about 1.5 wt % and 8.0 wt % and more effective than Catalysts 1 and 2 having higher amounts of sodium.

Catalyst 11 having 0.5 wt % palladium and no platinum, on a support comprising zeolite Y having a sodium content of 3.1 wt %, provided outstanding desulfurization and denitrogenation and above average dearomatization performance, cetane number improvement, and volume expansion. Catalyst 11, absent platinum was more effective than Catalyst 10 absent palladium. Catalyst 11 was less effective than Catalyst 5 having a mixture of platinum and palladium hydrogenation metals but the same sodium concentration. Catalyst 11 was comparable or more effective Catalysts 1 through 4 and 7 having mixtures of the metals and divergent sodium contents but less preferred than Catalysts 5 and 6 comprising a mixture of the hydrogenation metals and the more particularly targeted sodium concentrations of between about 1.5 wt % and 8.0 wt %.

Catalyst 12 comprising a physical mixture of 0.25 wt % palladium and 0.25 wt % platinum, on a support comprising zeolite Y having a sodium content of 3.1 wt %, provided outstanding denitrogenation but below average cetane number improvement and volume expansion and poor dearomatization and desulfurization. Catalyst 12, comprising a physical mixture of palladium and platinum was substantially less effective than Catalyst 5 wherein both metals were coimpregnated and incorporated onto all of the catalyst. Catalyst 12 was less effective than Catalysts 3 through 7 having particularly targeted sodium concentrations of between about 1.5 wt % and 8.0 wt % and comparable in effectiveness to Catalysts 1 and 2 having higher amounts of sodium.

Catalyst 13 having the increased metals concentrations of 1.05 wt % palladium and 0.30 wt % platinum, on a support comprising zeolite Y having a sodium content of 3.1 wt % provided outstanding performance in every area of comparison and was superior to each of Catalysts 1 through 12 previously tested.

Catalyst 14 which was similar to Catalyst 13 with an increase in zeolite Y sieve content of from 60 percent to 80 percent similarly provided outstanding performance in every area of comparison and was comparable in effectiveness to Catalyst 13. However, the higher sieve content resulted in increased hydrocracking which can be undesirable in many refinery situations.

That which is claimed is:

1. A hydrogenation catalyst suitable for hydrogenation of a hydrocarbon feedstock comprising a support comprising zeolite Y and from about 0.1 percent to about 2.0 percent by weight each of palladium and platinum calculated as a percentage of said catalyst, said palladium and platinum incorporated onto said support comprising zeolite Y in a weight ratio ranging from about 5:1 to about 1:2 and said zeolite Y comprising sodium in an amount ranging from about 1.5 weight percent to about 6.0 weight percent as a percentage of said zeolite Y.

2. The catalyst of claim 1 wherein said support comprises from about 50 percent to about 80 percent by weight zeolite Y.

3. The catalyst of claim 2 wherein said support comprises alumina.

4. The process of claim 1 wherein said zeolite Y comprises from about 1.5 percent to about 5.0 percent by weight sodium.

5. The catalyst of claim 1 wherein said zeolite Y has a silicon to aluminum atomic ratio ranging from about 1.5 to about 7.0.

6. The catalyst of claim 1 wherein said palladium and said platinum are present in a weight ratio ranging from about 3:1 to about 1:1.

7. A hydrogenation catalyst suitable for hydrogenation of a hydrocarbon feedstock comprising a support component comprising zeolite Y, and from about 0.1 percent to about 2.0 percent by weight each of palladium and platinum, calculated as a percentage of said catalyst, wherein said zeolite Y comprises sodium in an amount ranging from about 1.5 weight percent to about 8.0 weight percent, calculated as a percentage of said zeolite Y.

8. The hydrogenation catalyst of claim 7 wherein said palladium and platinum are incorporated onto said support comprising zeolite Y in a weight ratio ranging from about 5:1 to about 1:2.

9. The hydrogenation catalyst of claim 7 wherein said zeolite Y comprises from about 1.5 weight percent to about 6.0 weight percent sodium, calculated as a percentage of said zeolite Y.

10. The hydrogenation catalyst of claim 7 wherein said zeolite Y has a silicon to aluminum atomic ratio ranging from about 1.5 to about 7.0.

11. The hydrogenation catalyst of claim 7 wherein said support comprises from about 50 percent by weight to about 80 percent by weight zeolite Y.

12. The hydrogenation catalyst of claim 7 wherein said support comprises alumina.

* * * * *